(12) United States Patent
Karaoguz et al.

(10) Patent No.: US 8,274,914 B2
(45) Date of Patent: Sep. 25, 2012

(54) SWITCH AND/OR ROUTER NODE ADVERTISING

(75) Inventors: Jeyhan Karaoguz, Irvine, CA (US);
James D. Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 184 days.

(21) Appl. No.: 12/365,030

(22) Filed: Feb. 3, 2009

(65) Prior Publication Data

US 2010/0195659 A1    Aug. 5, 2010

(51) Int. Cl.
*H04L 12/28* (2006.01)
(52) U.S. Cl. ......................................... 370/254; 370/351
(58) Field of Classification Search .................. None
See application file for complete search history.

(56) References Cited

U.S. PATENT DOCUMENTS

| | | | |
|---|---|---|---|
| 7,483,387 B2 * | 1/2009 | Guichard et al. | 370/252 |
| 7,606,154 B1 * | 10/2009 | Lee | 370/232 |
| 7,639,680 B1 * | 12/2009 | Roy et al. | 370/389 |
| 2002/0018447 A1 * | 2/2002 | Yamada et al. | 370/252 |
| 2003/0026268 A1 * | 2/2003 | Navas | 370/400 |
| 2004/0252635 A1 * | 12/2004 | Kasper | 370/216 |
| 2006/0013125 A1 * | 1/2006 | Vasseur et al. | 370/217 |
| 2006/0092952 A1 * | 5/2006 | Boutros et al. | 370/400 |
| 2006/0140111 A1 * | 6/2006 | Vasseur et al. | 370/216 |
| 2006/0215577 A1 * | 9/2006 | Guichard et al. | 370/254 |
| 2007/0180495 A1 * | 8/2007 | Hardjono et al. | 726/3 |
| 2007/0183334 A1 * | 8/2007 | White et al. | 370/238 |
| 2007/0195700 A1 * | 8/2007 | Katoh et al. | 370/235 |
| 2008/0056264 A1 * | 3/2008 | Ong | 370/392 |
| 2008/0130500 A1 * | 6/2008 | Retana et al. | 370/235 |
| 2008/0159144 A1 * | 7/2008 | Nagarajan et al. | 370/235 |
| 2008/0192762 A1 * | 8/2008 | Kompella et al. | 370/410 |
| 2010/0061301 A1 * | 3/2010 | Antal et al. | 370/328 |

* cited by examiner

*Primary Examiner* — Phirin Sam
(74) *Attorney, Agent, or Firm* — Brinks Hofer Gilson & Lione

(57) ABSTRACT

A first of a plurality of intermediate routing devices is operable to advertise to and/or receive status information from remaining one(s) of the intermediate routing devices. The intermediate routing devices may store and/or analyze the advertised and/or received status information and may make routing decisions based on it. The first routing device may advertise status information for itself and/or for one or more other intermediate routing devices. Data may be routed based on type of data, service level and/or priority associated with the data. The advertised and/or received status information comprises current status information, predicted status information and/or past status information which may be based on one or more of port status, CPU utilization, memory utilization, quality of service (QoS), bandwidth utilization, bandwidth availability, traffic load, congestion, number of connections handled and capability to provide a particular level of service.

20 Claims, 4 Drawing Sheets

SWITCH AND/OR ROUTER NODE ADVERTISING

CROSS-REFERENCE TO RELATED APPLICATIONS/INCORPORATION BY REFERENCE

Not applicable

FIELD OF THE INVENTION

Certain embodiments of the invention relate to communication systems. More specifically, certain embodiments of the invention relate to switch and/or router node advertising.

BACKGROUND OF THE INVENTION

The growth of networking and systems' connectivity are some of the major developments in recent decades. Fewer and fewer systems and devices are operated as stand-alone entities, and most of today's systems are increasingly becoming elements in complex networks. This growth in networking allows improved performance and increased flexibility. For example, personal computers (PCs) and other specialized devices including, for example, printers, audiovisual devices and other devices, are connected together as nodes in computer networks. Networks are designated in a variety of ways, and based on a variety of factors. Network designation may be spatial, based on the scope of connectivity among the network nodes. For example, a network may be designated as a personal area network (PAN), a local area network (LAN), and wide area network (WAN). Network designation may also be based on the backbone connecting technology. For example, a network may be designated as an Ethernet network, a wireless network, and/or a fiber optical network. Some networks are circuit switched and are built around dedicated node-to-node connectivity, wherein a dedicated circuit is created and reserved, when needed, between the communicating nodes. Other nodes are then barred from utilizing the same connection and/or other entities in the network to the extent necessary to maintain the circuit. Most networks in use nowadays, however, are based on packet switched networks. In packet switched networks, the sending node simply transmits traffic that is destined for one or more receiving nodes. The traffic comprises packets that contain, in addition to data, other information that enables directing the packets to the receiving nodes. For example, most of today's networks are Internet based network and utilizes various protocols comprising TCP/IP, for example, to facilitate packet switching. In this regard, data is encapsulated into packets that comprise a header portion and a payload portion to enable transporting, addressing and/or routing among various entities within or coupled to the network.

Network switching devices, comprising such devices as switches, routers and/or hubs, are utilized in networks to facilitate forwarding of traffic between sending and receiving nodes. Hubs contain multiple ports, wherein packets arriving at one port are transmitted via all remaining ports. Consequently, hubs are generally operable to perform minimal processing. Switches also comprise multiple ports, but unlike hubs, switches are more actively functional in performing routing operations. For example, switches maintain routing information that enable the switches to examine received packets and process them accordingly to determine whether the packets are transmitted via the switch, and if so, to determine the appropriate ports to perform that transmission. Switches may store, generate, and/or maintain addressing related information of accessible network nodes.

Some network switches, however, may block traffic. Blocking occurs when a switch reaches a point where it is unable to perform additional switching even though it has not reached its theoretical maximum throughput, which generally is based on the combined maximum speeds of all of its ports.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for switch and/or router node advertising, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for switch and/or router node advertising. In various embodiments of the invention, a wired and/or wireless network comprises a plurality of routing nodes. The plurality of routing nodes comprises a plurality of intermediate routing devices. The plurality of intermediate routing devices comprise a first intermediate routing device that is operable to advertise status information to one or more remaining ones of the plurality of intermediate routing devices. In addition, the first intermediate routing device is operable to receive status information from one or more of the remaining intermediate routing devices. In this regard, routing decisions are based on the advertised status information and/or the received status information. Notwithstanding, the routing of data occurs independent of input from a central management entity.

The first routing device may advertise status information for itself and/or for one or more of the remaining ones of the plurality of routing devices. Data may be routed based on a type of the data, a service level and/or a priority associated with the data. In this regard, the advertised and/or received status information comprises current status information, predicted status information and/or past status information which may be based on one or more of port status, CPU utilization, memory utilization, quality of service (QoS), bandwidth utilization, bandwidth availability, traffic load, congestion, number of connections handled and capability to provide a particular level of service. The advertised status may be sent by the first intermediate routing device and/or received from one or more of the remaining intermediate routing devices periodically, aperiodically, by request and/or based on the occurrence of one or more events. In various embodiments of the invention, the routing devices may store and/or analyze the received and/or advertised status information and may make routing decisions based on the information. In this manner, data routing is modified according to current conditions in a network.

Figure 1:
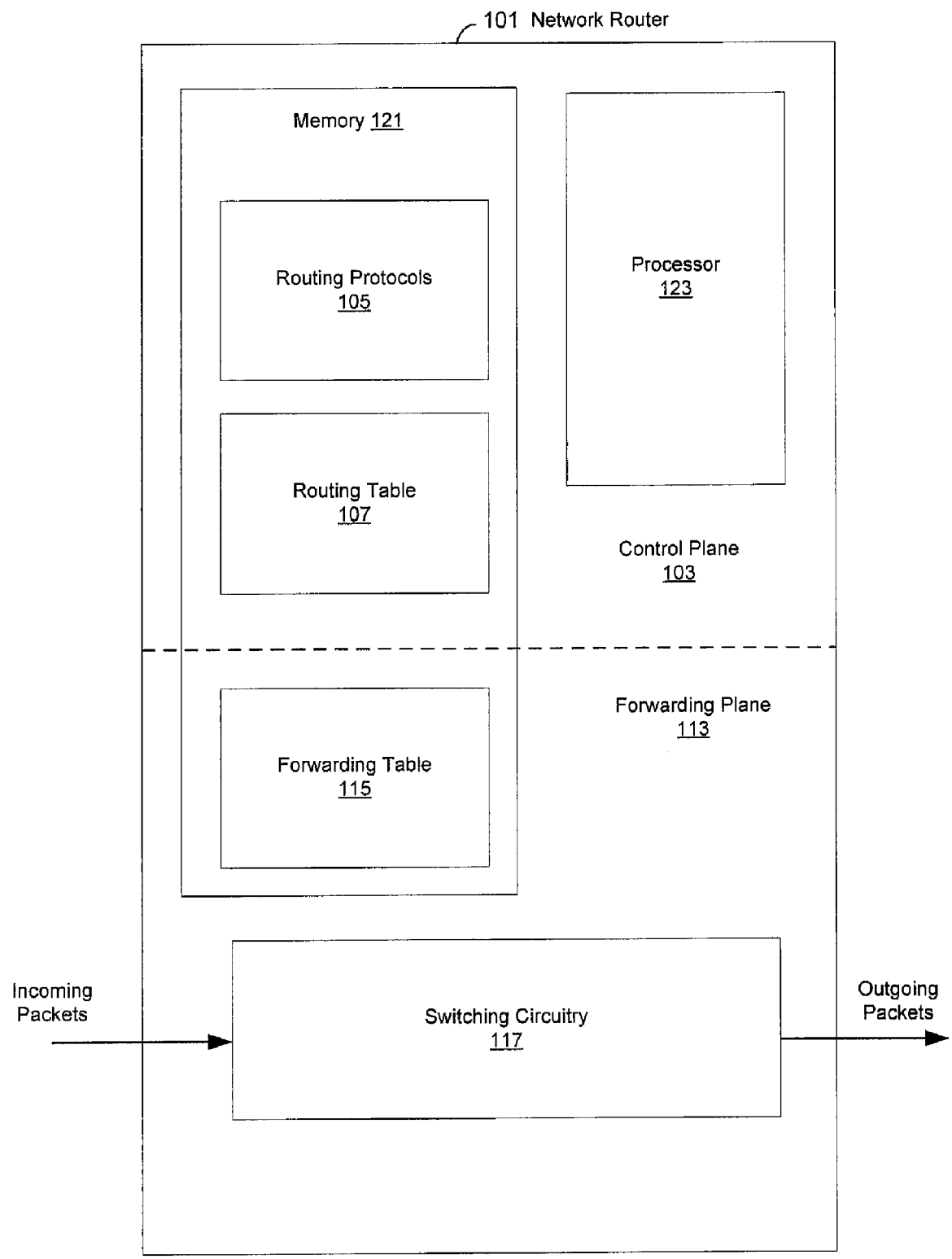
FIG. 1 is a block diagram that illustrates an exemplary intermediate routing device, in accordance with an embodiment of the invention.

FIG. 1 is a block diagram that illustrates an exemplary intermediate routing device, in accordance with an embodiment of the invention. Referring to FIG. 1, there is shown a network router device 101, a processor 123, a memory 121, a control plane 103, routing protocols 105, a routing table 107, a forwarding plane 113, a forwarding table 115 and a switching circuitry 117.

The network router device 101 comprises suitable logic, circuitry and/or code that is operable to determine how to route packets and to forward network traffic received from one sub-network to another sub-network. Routing operations may be performed based on one or more networking layers, for example, based on the Open Systems Interconnection (OSI) Model. The network routing devices 101 may be operable to perform L3 and/or L4 operations.

The control plane 103 comprises suitable logic, circuitry and/or code that are operable to determine how the network routing device 101 will handle packets that are received and forwarded via the forwarding plane 113. The control plane 103 is operable to determine that a packet may be discarded or that a packet may receive a specified quality of service. The control plane 103 comprises routing protocols 105 that may specify how the network router device 101 communicates with other network router devices and/or how routes are selected, for example. In addition, the routing protocol 105 may determine how a routing table is constructed. Exemplary routing protocols 105 comprise interior gateway routing protocol (IGRP), open shortest path first (OSPF), routing information protocol (RIP) and intermediate system to intermediate system (IS-IS). The control plane 103 also comprises the routing table 107 that may comprise routes to particular network destinations.

The forwarding plane 113 comprises suitable logic, circuitry and/or code that is operable to accept a packet arriving on an incoming link, look up a destination address for the incoming packet and determine an internal path through the switching circuitry 105 that will direct the packet out via a proper outgoing link. The forwarding plane is operable to encapsulate outgoing packets and set various packet fields. For example, the forwarding plane may modify a field for quality of service or may decrement a time-to-live field in the packet and may discard the packet if the time-to-live equals zero. The forwarding plane may update a check sum.

The switching circuitry 117 comprises suitable logic, circuitry and/or code that are operable to direct packets received from an incoming link to one or more outgoing links. The switching circuitry 117 may comprise, for example, input queuing and output queuing. In addition, the switching circuitry 117 may comprise a subsystem which comprises suitable logic, circuitry, and/or code that may enable exchange of data and/or messaging via a plurality of physical interconnects.

The memory 121 may comprise suitable logic, circuitry and/or code that are operable to store instructions and/or parameters that enable functionality described with respect to the control plane 103 and/or the forwarding plane 113. The memory 121 may be operable to store packet data that may be received and/or forwarded by the network router 101. In addition, the memory 121 may store the routing table 107. The routing table 107 may comprise routing information that may be sent to the forwarding table 115 in the forwarding plane 113. The routing information may comprise preferred routes chosen by a routing algorithm for forwarding packets. The memory 121 may be communicatively coupled to the processor 123 and/or the switching circuitry 117.

The processor 123 may comprise suitable logic, circuitry and/or code that are operable to execute instructions and/or utilize parameters that enable functionality described with respect to the control plane 103 and/or the forwarding plane 113. The processor 123 may manage the communication of packets based on the routing protocols 105. In addition, the processor 123 may receive information from other routers and/or other network devices and may utilize the received information to construct the routing table 115. In addition, the processor 123 is operable to receive current status information from other network devices and make routing decisions based on the current status information. The processor 123 may be communicatively coupled to the memory 121 and/or the switching circuitry 117.

In operation, the network router device 101 is utilized to perform network router operations. The network router device 101 may be utilized, for example, in a local area network (LAN), to enable transfer of traffic packets between network nodes in the LAN. For example, where received traffic packets are TCP/IP traffic packets, the IP headers are parsed to determine the source and/or destination addressing information for the received traffic packets. Once the destination nodes are determined, based on routing tables maintained in the memory 121 for example, the packets are transmitted via the forwarding plane 113.

The network router device 101 is operable, for example, to maintain routing information that enables mapping of a set of destination addresses corresponding to various network nodes, to a plurality of outgoing links in the router device 101. The routing information is stored, generated, and/or maintained by the processor 123 of the network router device 101, for example. Once the appropriate outgoing links are determined for a received packet, the switching circuitry 117 is utilized to transfer the packet to the appropriate outgoing links.

In some network router devices, for example, hardware, software and/or logic limitations in the network router device 101 may result in 'blocking.' Blocking occurs when a router reaches a point where it is unable to perform additional switching even though it has not yet reached its theoretical maximum throughput, which generally is based on the aggregate maximum speeds of all of its ports.

In various embodiments of the invention, the processor 123 is operable to receive current status information that is advertised by one or more other network router devices. In this regard, the processor 123 is operable to make routing decisions based on the advertised and/or received current status information. In addition, the processor 123 controls advertising of current status information of the network router device 101 to other network router devices. In this manner, the routing of packets may occur independent of input from a central management entity.

In an exemplary aspect of the invention, the network router device 101 is operable to communicate information to one or more neighboring router devices regarding its present ability to handle various types of traffic. For example, the network router device 101 is operable to communicate information regarding various operating conditions or regarding a level of service or quality of service it is currently able to provide. For example, when the network router device 101 is carrying a heavy traffic load and/or is currently congested, it is operable to communicate to its neighbors what type of additional traffic it can or cannot handle. In some embodiments of the invention, the network router device 101 is operable to send actual, estimated and/or predicted information comprising current load, CPU usage, memory usage and availability, and number of connections being handled, to other router devices or user devices.

In addition, the network router device 101 is operable to receive similar information from one or more of its neighbors and can make decisions about where to route the various types of traffic based on that information. For example, traffic such as IP telephony, multimedia streaming and/or traffic that can tolerate a greater level of latency may be assigned varying levels of priority for quality of service (QoS). In this regard, the network router device 101 is operable to determine QoS requirements for one or more received packets. The network router device 101 determines to which neighboring node to forward the received packets based on current conditions within the neighboring nodes. In various embodiments of the invention, although standardized QoS priority levels are utilized, the invention is not limited in this regard. Accordingly, any suitable information may be communicated between network nodes to provide current operational capabilities in the network router device 101.

In an exemplary embodiment of the invention, the network router device 101 may be enabled to send IP telephony packets to a specified destination via a plurality of routes wherein two or more of the routes comprise a different number of hops to reach the specified destination. In instances when traffic is not congested, the network router device 101 chooses a route comprising a least number of hops and sends packets to a nearest neighbor on the chosen route. However, in instances when the network router device 101 receives information indicating that the chosen neighbor or another node on the chosen route is experiencing traffic congestion and/or QoS limitations, the network router device 101 may choose a different route to handle delivery of the IP telephony packets more reliably.

Figure 2:
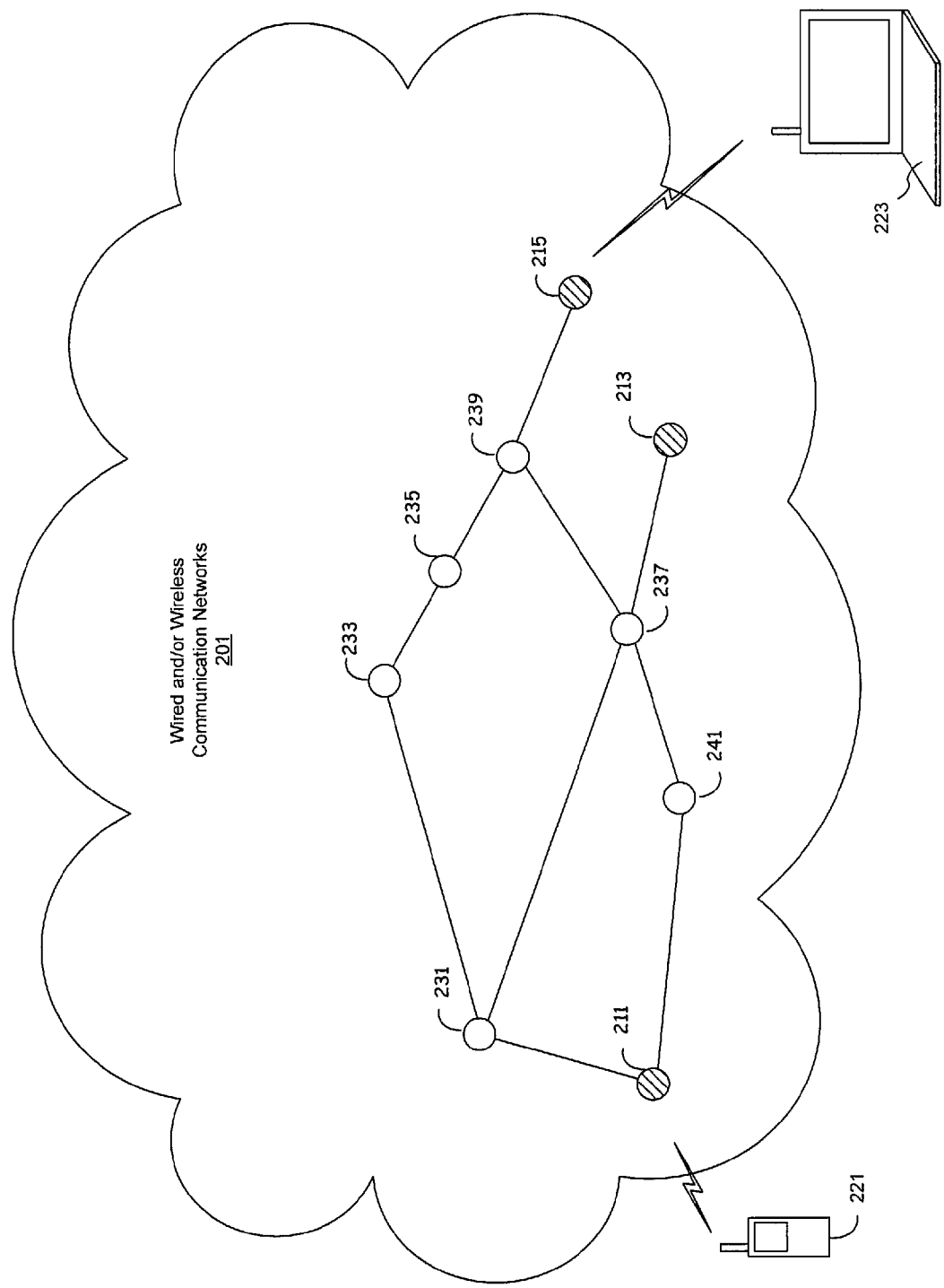
FIG. 2 is a block diagram illustrating an exemplary cluster of routing nodes that are enabled to make routing decisions based on a current status of other routers, in accordance with an embodiment of the invention.

FIG. 2 is a block diagram illustrating an exemplary cluster of routing nodes that are enabled to make routing decisions based on a current status of other routers, in accordance with an embodiment of the invention. Referring to FIG. 2, there is shown a wired and/or wireless network 201, a handheld wireless device 221, a laptop 223, access points 211, 213 and 215 and intermediate routing nodes 231, 233, 235, 237, 239 and 241.

The wired and/or wireless network 201 comprises a cluster of intermediate routing nodes 231, 233, 235, 237, 239 and 241 and access points 211, 213 and 215 that enable endpoint devices to communicate. The access points 211, 213 and 215 are operable to connect the handheld wireless device 221 and the laptop 223 with the wired and/or wireless network 201. In this regard, the access points 211, 213 and 215 may comply with 802.11 standards and/or variants thereof.

The intermediate routing nodes 231, 233, 235, 237, 239 and 241 comprise suitable logic, circuitry and/or code that enable routing and/or forwarding of packets to other routers and/or to the one more access points 211, 213 and 215. The intermediate routing nodes 231, 233, 235, 237, 239 and 241 may be similar to the network router device 101 described with respect to FIG. 1. In addition, the intermediate routing nodes 231, 233, 235, 237, 239 and 241 are operable to advertise to each other, information about their current condition and/or their ability to handle a various types of traffic. The shared information may be utilized to determine a best route for a given type of traffic. In various embodiments of the invention, an intermediate router may not be functioning at full capacity, for example, a line card or one or more ports is not functioning or is impaired. The intermediate router is operable to advertise information regarding the impairment to its neighboring intermediate network routing devices so that they may make appropriate routing decisions to avoid dropping packets or high BER.

In addition, the intermediate network routing devices 231, 233, 235, 237, 239 and 241 are operable to advertise to each other when they are unable to handle additional traffic or additional traffic of a certain type that requires a high bandwidth and/or high quality of service. For example, this may be due to traffic loading conditions where queues are nearly full and/or internal resource utilization reaches a high level. In various embodiments of the invention, the intermediate routing devices are operable to advertise, for example, a maximum QoS level that they are enabled to handle or any spare bandwidth that is available. In this manner, other intermediate routing devices may avoid degraded service by finding alternate routes for packets with a QoS level above the advertised maximum. In other embodiments of the invention, a header field is defined in a packet structure that indicates the type of application that the packet is part of. For example, the header field may indicate that the packet is part of a HD quality video stream or an IP telephony voice data stream. In this regard, the intermediate routing devices are operable to advertise to each other whether or not they can handle packets of specified applications.

In operation, the laptop 223 and the handheld wireless device 221 may be exchanging voice data via an IP telephony connection. The voice data may be assigned a high level of QoS. Packets of voice data may traverse a path with the least number of hops via the intermediate network nodes 239, 237 and 241 between the APs 215 and 211. During the connection, the intermediate network node 237 begins to experience heavy traffic such that its ability to support additional traffic with a quality of service greater than or equal to a specified level is impaired. The network routing device 237 is operable to advertise information regarding its current QoS limitation to its neighboring intermediate routing nodes 239 and/or 241. The routing node 239 may begin forwarding the high QoS voice packets from the laptop 223 to the handheld wireless device 221 via the intermediate routing node 235 to avoid traffic congestion at the intermediate routing node 237. In this regard, the voice traffic packets may arrive at the handheld wireless device 221 sooner than if they had been handled by the intermediate device 237 even though they traverse a greater number of hops. The intermediate routing node 239 may continue to send traffic to the intermediate routing node 237 when the traffic comprises a QoS less than or equal to the specified QoS level.

Figure 3:
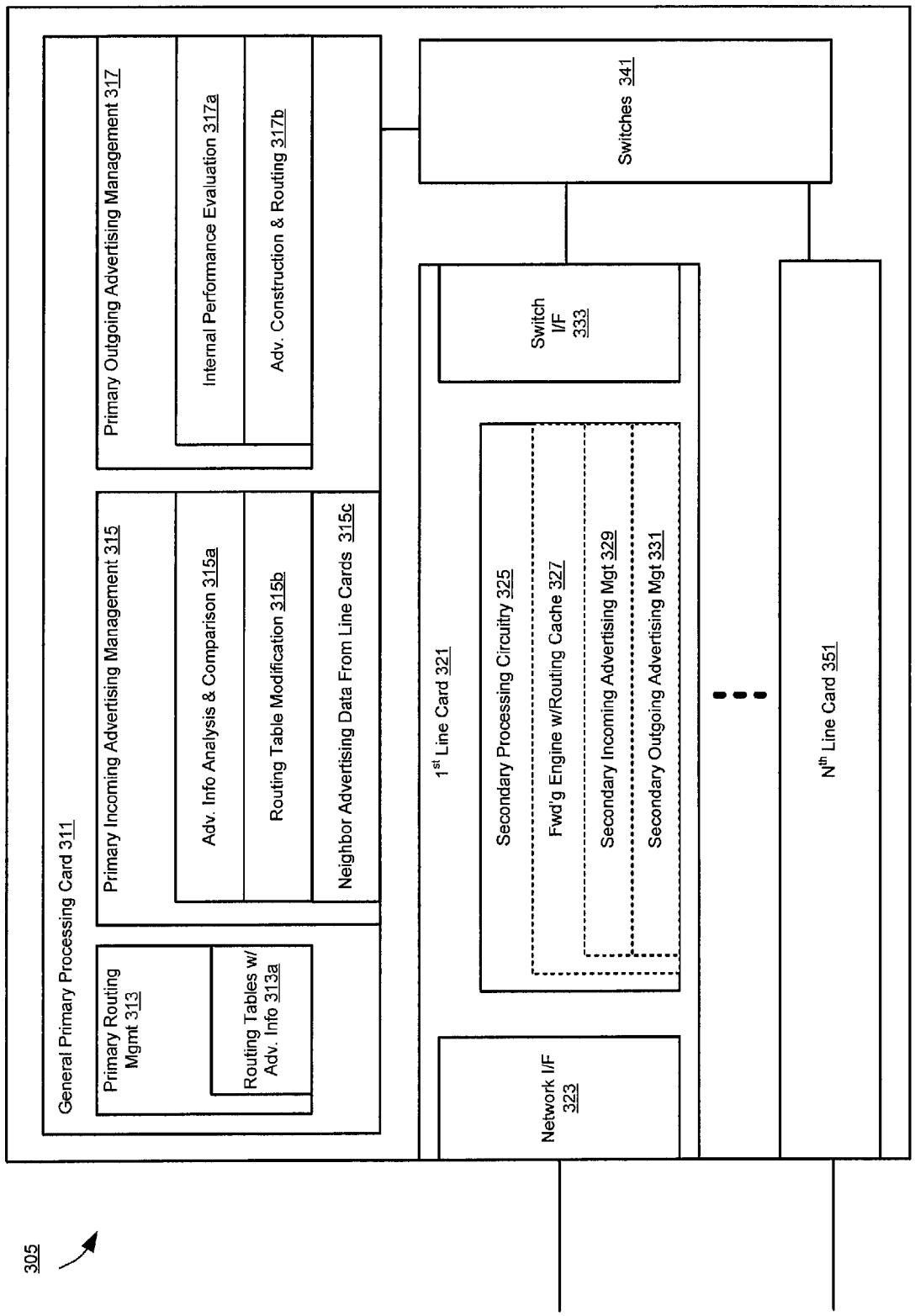
FIG. 3 is a block diagram illustrating an exemplary intermediate routing device enabled to share current operating information with other intermediate routing devices and to make routing decisions based on received current operating information, in accordance with an embodiment of the invention.

FIG. 3 is a block diagram illustrating an exemplary intermediate routing device enabled to share current operating information with other intermediate routing devices and to make routing decisions based on received current operating information, in accordance with an embodiment of the invention. Referring to FIG. 3, there is shown an intermediate routing device 305, a general primary processing module 311, a primary routing management module 313, routing tables 313a, a primary incoming advertising management module 315 and an advertising information analysis and comparison module 315a. FIG. 3 also shows a routing table modification module 315b, an advertising data collection module 315c, a primary outgoing advertising management module 317, an internal performance evaluation module 317a and an advertising construction and routing module 317b. FIG. 3 also illustrates a first line card 321, a network interface 323, a secondary processing circuitry 325, a forwarding engine with routing cache 327, a secondary incoming advertising management module 329, a secondary outgoing advertising management module 331, a switch interface 333, router circuitry 341 and an $N^{th}$ line card 351.

The intermediate routing device 305 comprises a plurality of line cards comprising the first line card 321 through the $N^{th}$ line card 351. The line cards two through the $N^{th}$ line card 351 comprise components similar to the components shown in the first line card 321. In addition, the intermediate routing device 305 comprises a primary processing card 311 and a switch 341.

The primary processing card 311 comprises suitable logic, circuitry and/or code that enable providing overall processing, control and management operations in the intermediate routing device 305. The primary processing card 311 comprises, for example, primary routing management module 313, which is operable to specifically manage packet routing operations to facilitate packet switching via the intermediate routing device 305. The primary routing management module 311 comprises the routing tables 313a that comprise routing data for the line cards 321 through 351. The routing data is determined with consideration of current information received from neighboring or more distant intermediate routing nodes about an ability of the routing nodes to handle additional traffic or specified types of traffic.

The primary incoming advertising management module 315 comprises suitable logic, circuitry and/or code to receive current information regarding the operational condition of neighboring intermediate routing nodes and make routing decisions informed by the received current information. The primary incoming advertising management module 315 comprises the advertising data collection module 315 that collects received current information from the line cards 321 through 351. The advertising information analysis and comparison module 315a analyzes and compares the received current information from a plurality of intermediate routing nodes to determine improved routing paths for various types of data. The routing table modification module 315b modifies the routing tables 313a according to the determined improvement routing paths. In addition, the primary incoming advertising management module 315 is operable to advise the line cards 321 through 351 with regard to which neighboring node to send packets to. In various embodiments of the invention, the primary incoming advertising management module 315 may forward instructions regarding where to route packets to the secondary processing circuitry 325 on line cards 321 through 351. For example, the primary incoming advertising management module 315 is operable to send a set of rules indicating which node to send packets to depending on a destination address. In this regard, the line cards are enabled to make routing decisions without accessing the primary processing card 311.

The primary outgoing advertising management module 317 comprises suitable logic circuitry and/or code to collect current internal performance and/or operational conditions and to advertise the current information to neighboring intermediate routing nodes. The internal performance evaluation module 317a is operable to collect performance information from the line cards 321 through 351. For example, the line cards are operable to report resource utilization and/or queuing levels that indicate their current capacity for additional traffic and/or traffic of a specified QoS assignment. The collected performance information is evaluated. The advertising construction and routing module 317b routes the performance information to neighboring intermediate routing nodes via the switching circuitry 341 and the secondary outgoing advertising management module 331 on the appropriate line cards 321 through 351.

The switching circuitry 341 comprises suitable logic, circuitry and/or code that enable routing switch traffic among the plurality of line cards 321 through 351. The switch circuitry 341 is substantially similar to the switch circuitry 105 described with respect to FIG. 1. In addition, the switching circuitry 341 is operable to exchange incoming current advertised information and outgoing current advertised information between the line cards 321 through 351 and the general primary processing card 311. In various embodiments of the invention, a monitoring agent within the switch circuitry 341 is operable to monitor performance on switch buses, switching fabric, network interface 323 queues and/or the line cards 321 through 351, for example, and report internal performance measurements to the primary outgoing advertising management module 317.

The line card 321 comprises the switch interface 333, the secondary processing circuitry 325 and the network interface 323. The network interface 323 comprises suitable logic, circuitry and/or code to physically provide network interfacing functionality in the first line card 321 based on one or more wired standards, including, for example, 10/100/1000 Mbit Ethernet, multi-gigabit Ethernet, and/or the 400+ Gbit Dense Wavelength Division Multiplexing (DWDM). The network interface subsystem 323 is also operable to enable external wireless accessibility via external radio. The network interface 341a is utilized, for example, to enable external communication of traffic data that is switched via the packet router 305. The switch interface 333 comprises suitable logic, circuitry and/or code to send packets received via the network interface 323 and forwarding engine with routing cache 327 to a switch interface on another line card via the switching circuitry 341. In addition, the switch interface 333 is operable to receive packets from another line card via the switching circuitry 341 and forward outbound packets to the network interface 323 via the forwarding engine with routing cache 327.

The secondary processing circuitry 325 comprises suitable logic, circuitry and/or code to route packets based on knowledge of current operating conditions in neighboring intermediate routing nodes. In this regard, the secondary processing circuitry may request from the primary processing card 311 routing information for packets with a specified destination. The primary processing card is operable to look up routing information in the routing table 313a that comprises routing information with adjustments or additional data for current conditions in other intermediate routing nodes. The primary processing card provides the secondary processing circuitry 325 with routing directions for the packet with a specified destination. In various embodiments of the invention, the primary processing card 311 is operable to send routing instructions to the forwarding engine with routing cache 327 which may store the routing instructions in the routing cache. The instructions may comprise multiple routing entries for a single destination that are to be utilized depending on current operating conditions. In this manner, the secondary incoming advertising management module 329 is operable to make routing decisions without having to access the primary processing card 311. In addition, the line cards 321 through 351 are operable to monitor their own performance and report their performance to the secondary outgoing advertising management module 331 and to the primary outgoing advertising management module 317. For example, the line cards 321 through 351 are operable to monitor queues associated with the network interface 323.

In operation, the router 305 is operable to monitor internal performance and/or traffic congestion within the line cards 321 through 351 and/or the switching circuitry 341. The information is analyzed and the outgoing advertising management module 317 determines which type of packets, priority of packets, and/or which level of QoS it may successfully handle. The determined information is sent to appropriate neighboring intermediate routing devices via the switching circuitry 341 and the appropriate line cards 321 through 351. In addition, the router 305 is operable to receive current information from a plurality of neighboring intermediate routing devices regarding types of packets and/or levels of QoS they may successfully handle. The primary incoming advertising management module 315 is operable to compare and/or analyze the received current information and modify routing tables accordingly. In this manner, the intermediate routing device 305 is enabled to make routing decisions based on current information from a plurality of nodes in the wired and/or wireless network 201.

Figure 4:
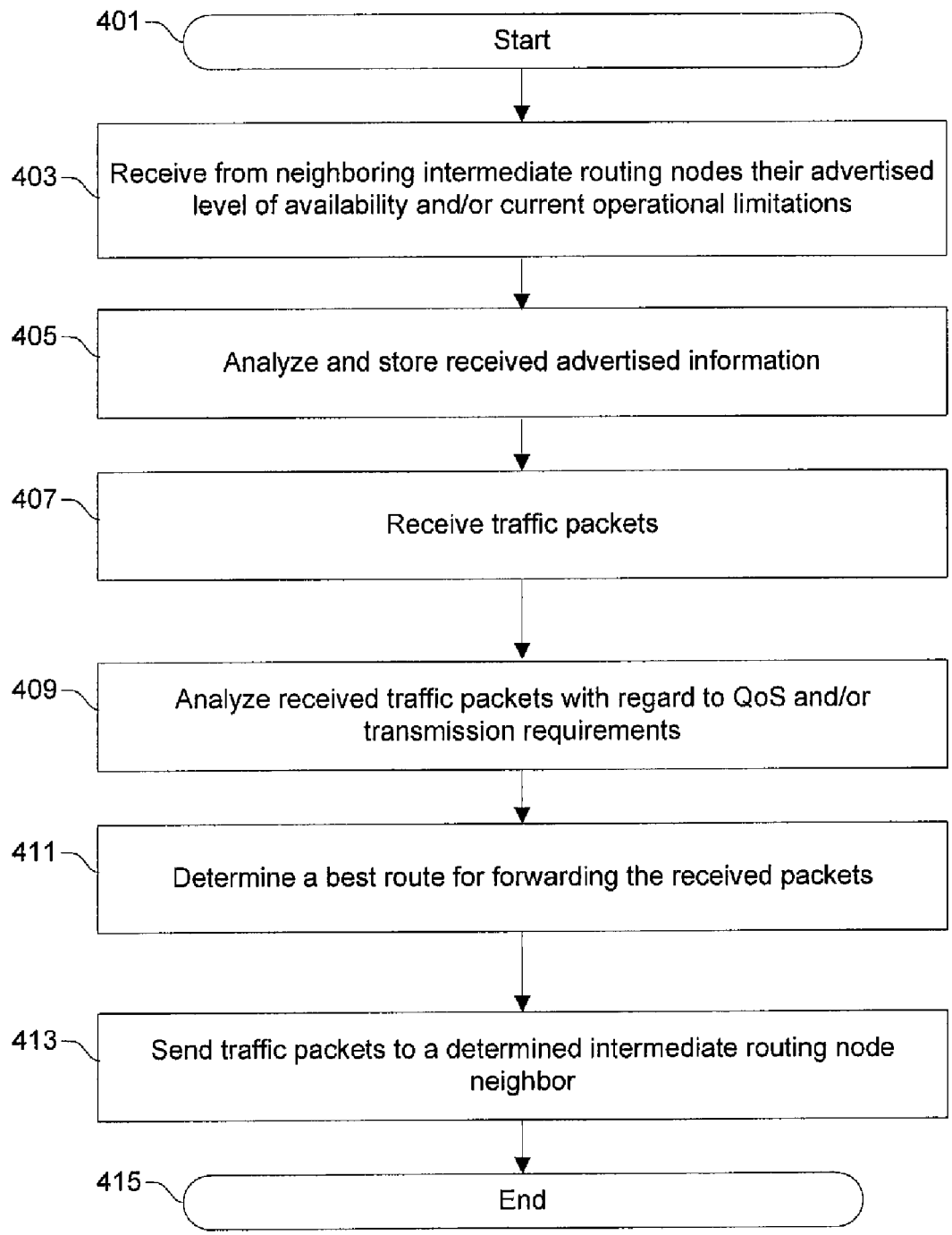
FIG. 4 is a flow chart illustrating exemplary steps for implementing intermediate routing node advertising, in accordance with an embodiment of the invention.

FIG. 4 is a flow chart illustrating exemplary steps for implementing intermediate routing node advertising, in accordance with an embodiment of the invention. In step 401, is a start step. In step 403, a first intermediate routing node, for example the node 239, receives from one or more neighboring intermediate routing nodes 231, 233, 235, 237 and/or 241 their advertised level of availability and/or current operational limitations. In step 405, the received advertised information from one or more intermediate routing devices 231, 233, 235, 237 and 241 may be analyzed and/or compared and stored. In step 407, traffic packets are received by the intermediate routing node 239. In step 409, the received traffic packets are analyzed with regard to QoS and/or transmission requirements. In step 411, the intermediate routing node 239 determines a best route for the received packets. In step 413, traffic packets are sent to a determined intermediate routing node neighbor. Step 515, is the end of exemplary steps.

In an embodiment of the invention, a wired and/or wireless network 201 comprises a plurality of routing nodes. The plurality of routing nodes comprises a plurality of intermediate routing devices 231, 233, 235, 237, 239 and 241. The plurality of intermediate routing devices 231, 233, 235, 237, 239 and 241 comprise a first intermediate routing device, for example, the intermediate routing device 239, that is operable to advertise status information to one or more remaining ones of the plurality of intermediate routing devices 231, 233, 235, 237 and 241. In addition, the first intermediate routing device 239 is operable to receive status information from one or more of the remaining intermediate routing devices 231, 233, 235, 237 and 241. In this regard, routing decisions are made by the processor 123 and are based on the advertised status information and/or the received status information. Notwithstanding, the routing of data occurs independent of input from a central management entity.

The first routing device 239 may advertise status information for itself and/or for one or more of the remaining ones of the plurality of routing devices 231, 233, 235, 237 and 241. Data may be routed based on a type of the data, a service level and/or a priority associated with the data. In this regard, the advertised and/or received status information comprises current status information, predicted status information and/or past status information which may be based on one or more of port status, CPU utilization, memory utilization, quality of service (QoS), bandwidth utilization, bandwidth availability, traffic load, congestion, number of connections handled and capability to provide a particular level of service. The advertised status may be sent by the first intermediate routing device 239 and/or received from one or more of the remaining intermediate routing devices 231, 233, 235, 237 and 241 periodically, aperiodically, by request and/or based on the occurrence of one or more events. In various embodiments of the invention, the intermediate routing devices 231, 233, 235, 237, 239 and 241 may store and/or analyze the received and/or advertised status information and may make routing decisions based on the information.

In another embodiment of the invention, a first intermediate routing device, for example, the intermediate routing node 233 is operable to communicate current information about its internal operating conditions to a second intermediate routing device, for example, the intermediate routing device 235. In this regard, the second intermediate routing device 235 is operable to perform routing decisions based on the communicated current information. For example, the first intermediate routing device 233 is operable to communicate or advertise a level of service that the first intermediate routing device 233 is currently able to provide. The current information may be communicated or advertised to other intermediate routing nodes 231, 235, 237, 239 and/or 241 on a periodic basis and/or responsive to changing operating conditions. In this manner, the second intermediate routing device 235 receives current information from the first intermediate device 233 and/or a plurality of other intermediate routing devices 231, 237, 239 and/or 241. The second intermediate routing device 235 stores the received current information in, for example, routing tables 313a and/or utilizes the current information to modify routing tables 313a. For example, the second intermediate routing device 235 is operable to compare the received current information from the first intermediate routing device 233 with current information from one or more other intermediate routing devices 231, 237, 239 and 241. In addition, the second intermediate routing device 235 is operable to make routing decisions based on the comparison. In various embodiments of the invention, the second intermediate routing device 235 is operable to forward the current information from the device 235 to one or more other intermediate routing devices 231, 237, 239 and 241. In this manner intermediate routing nodes are enabled to improve routing of packets through the wired and/or wireless network with improved reliability.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for switch and/or router node advertising.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embodied in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking, the method comprising:
   in a communication system comprising a plurality of routing devices,
   advertising status information from a first of said plurality of routing devices to one or more remaining ones of said plurality of routing devices, wherein said first of said plurality of routing devices comprises an intermediate routing device;
   receiving at said first of said plurality of routing devices, advertised status information from said one or more remaining ones of said plurality of routing devices,
   routing data by said first routing device, among at least a portion of said routing devices based on communication requirements of said data and based on said advertised status information from said first of said plurality of routing devices and/or said received advertised status information from said one or more remaining ones of said plurality of routing devices;
   advertising said status information from said first plurality of routing devices and/or receiving said advertised status information from said one or more remaining ones of said plurality of routing devices periodically, aperiodically, by request and/or based on the occurrence of one or more events.

2. The method according to claim 1, wherein said routing occurs independent of input from a central management entity.

3. The method according to claim 1, wherein said status information advertised from said first of said plurality of routing devices comprises status information for said first of said plurality of routing devices, and/or status information for said one or more remaining ones of said plurality of routing devices.

4. The method according to claim 1, comprising routing said data based on a type of said data, a service level, and a priority associated with said data.

5. The method according to claim 1, wherein each of said plurality of routing devices stores advertised status information that it receives and that it advertises.

6. The method according to claim 5, wherein each of said plurality of routing devices analyzes said stored advertised status information that it receives and that it advertises.

7. The method according to claim 6, wherein each of said plurality of routing devices handles routing of data based on said analyzed stored advertised status information that it receives and that it advertises.

8. A system for networking, the system comprising:
   one or more circuits for use in a first of a plurality of routing devices in a communication system, wherein said first of said plurality of routing device comprises an intermediate routing device and wherein said one or more circuits are operable to advertise status information to one or more remaining ones of said plurality of routing devices;
   said one or more circuits are operable to receive at said first of said plurality of routing devices, advertised status information from said one or more remaining ones of said plurality of routing devices; and
   said one or more circuits are operable to route data among at least a portion of said routing devices based on communication requirements of said data and based on said advertised status information from said first of said plurality of routing devices and/or said received advertised status information from said one or more remaining ones of said plurality of routing devices, wherein said one or more circuits are operable to advertise said status information from said first of said plurality of routing devices and/or receive said advertised status information from said one or more remaining ones of said plurality of routing devices periodically, aperiodically, by request and/or based on the occurrence of one or more events.

9. The system according to claim 8, wherein said routing occurs independent of input from a central management entity.

10. The system according to claim 8, wherein said status information advertised from said first of said plurality of routing devices comprises status information for said first of said plurality of routing devices, and/or status information for said one or more remaining ones of said plurality of routing devices.

11. The system according to claim 8, wherein said one or more circuits are operable to route said data based on a type of said data, a service level, and a priority associated with said data.

12. The system according to claim 8, wherein each of said plurality of routing devices stores advertised status information that it receives and that it advertises.

13. The system according to claim 12, wherein each of said plurality of routing devices analyzes said stored advertised status information that it receives and that it advertises.

14. The system according to claim 13, wherein each of said plurality of routing devices handles routing of data based on said analyzed stored advertised status information that it receives and that it advertises.

15. A method for networking, the method comprising:
   in a communication system comprising a plurality of routing devices,
   advertising status information from a first of said plurality of routing devices to one or more remaining ones of said plurality of routing devices, wherein said first of said plurality of routing devices comprises an intermediate routing device;
   receiving at said first of said plurality of routing devices, advertised status information from said one or more remaining ones of said plurality of routing devices; and
   routing data by said first routing device, among at least a portion of said routing devices based on communication requirements of said data and based on said advertised status information from said first of said plurality of routing devices and/or said received advertised status information from said one or more remaining ones of said plurality of routing devices;
wherein said advertised status information from said first of said plurality of routing devices and said received advertised status information from said one or more remaining ones of said plurality of routing devices comprises current status information, predicted status information and/or past status information.

16. The method according to claim 15, wherein said current status information, predicted status information and/or past status information comprises one or more or port status, CPU utilization, memory utilization, QoS, bandwidth utilization, bandwidth availability, traffic load, congestion, number of connections handled and capability to provide a particular level of service.

17. A system for networking, the system comprising:
one or more circuits for use in a first of a plurality of routing devices in a communication system, wherein said first of said plurality of routing devices comprises intermediate routing device and wherein said one or more circuits are operable to advertise status information to one or more remaining ones of said plurality of routing devices;
said one or more circuits are operable to receive at said first of said plurality of routing devices, advertised status information from said one or more remaining ones of said plurality of routing devices; and
said one or more circuits are operable to route data among at least a portion of said routing devices based on communication requirements of said data and based on said advertised status information from said first of said plurality of routing devices and/or said received advertised status information from said one or more remaining ones of said plurality of routing devices;
wherein said advertised status information from said first of said plurality of routing devices and said received advertised status information from said one or more remaining ones of said plurality of routing devices comprises current status information, predicted status information and/or past status information.

18. The system according to claim 17, wherein said current status information, predicted status information and/or past status information comprises one or more of port status, CPU utilization, memory utilization, QoS, bandwidth utilization, bandwidth availability, traffic load, congestion, number of connections handled and capability to provide a particular level of service.

19. The system according to claim 17, wherein each of said plurality of routing devices stores advertised status information that it receives and that it advertises.

20. The system according to claim 19, wherein each of said plurality of routing devices analyzes said stored advertised status information that it receives and that it advertises.

* * * * *